US006148178A

United States Patent [19]

Nelms et al.

[11] Patent Number: 6,148,178

[45] Date of Patent: Nov. 14, 2000

[54] SELECTIVE CALL MESSAGE FORMATTING

[75] Inventors: Robert Nathan Nelms, Lake Worth, Fla.; Scott Christopher Smith, St. Louis, Mo.

[73] Assignee: Motorola, Inc., Schaumburg, Ill.

[21] Appl. No.: 08/807,933

[22] Filed: Feb. 28, 1997

[51] Int. Cl.[7] ................................ G08B 5/22; H04B 7/26

[52] U.S. Cl. ........................ 455/38.4; 455/45; 340/825.44

[58] Field of Search .................................. 455/38.1, 38.4, 455/45, 566, 575; 340/825.44; 345/141, 143

[56] References Cited

U.S. PATENT DOCUMENTS

| | | | |
|---|---|---|---|
| 4,369,443 | 1/1983 | Giallanza et al. | 340/825.44 |
| 4,845,491 | 7/1989 | Fascenda et al. | 340/825.44 |
| 4,855,949 | 8/1989 | Garland et al. | 345/141 |
| 4,870,402 | 9/1989 | DeLuca et al. | 340/825.44 |
| 5,107,259 | 4/1992 | Weitzen et al. | 340/825.44 |
| 5,140,419 | 8/1992 | Galumbeck et al. | 340/825.44 |
| 5,543,781 | 8/1996 | Ganucheau et al. | 340/825.44 |

*Primary Examiner*—Reinhard J. Eisenzopf
*Assistant Examiner*—Lester G. Kincaid
*Attorney, Agent, or Firm*—Gregg E. Rasor

[57] ABSTRACT

A selective call device (130) having a receiver (204) that receives a selective call signal with an address (312), a formatting message (406), and a related message (408). A processor (214) correlates a recovered address with a predetermined address in the selective call device (130) and determines selection of the selective call device (130). A decoder (212) decodes the formatting message (406) and the related message (408) contained in the selective call signal in response to the processor (214) determining selection of the selective call device. An information display (228) presents at least a portion of the related message (408) in accordance with a format determined at least in part by the formatting message (406).

14 Claims, 4 Drawing Sheets

SELECTIVE CALL MESSAGE FORMATTING

FIELD OF THE INVENTION

This invention relates in general to wireless messaging and more particularly to consistently formatting messages received by a wireless messaging receiver.

BACKGROUND OF THE INVENTION

A conventional selective call device, e.g., a receiver and/or transmitter, often can receive messages from more than one sources. Sources are distinguished from each other typically by an address information associated with each message. When the address information correlates, or matches, a predetermined address in the selective call device, the selective call device receives and stores the message from a particular information source.

Modern selective call services or service providers are capable of sending multiple types of data including information services, for example, stock market, weather, sports, news or other information, periodically to a subscribing selective call device (receiver or transceiver). Before long, hundreds of information services are likely to be broadcast to selective call devices. Because service providers may pre-format the information into a specific format, e.g., either right of left justified or in aligned columns, a problem results if one selective call device presents this information differently from another due to differing display characteristics such as pixel density, the number of horizontal lines, or vertical lines.

Thus, what is needed is an apparatus that allows messages received from personal sources or information services to be received and presented in a consistent fashion across a number of selective call devices, allowing all users to view messages as intended by the information provider.

DESCRIPTION OF A PREFERRED EMBODIMENT

Figure 1:
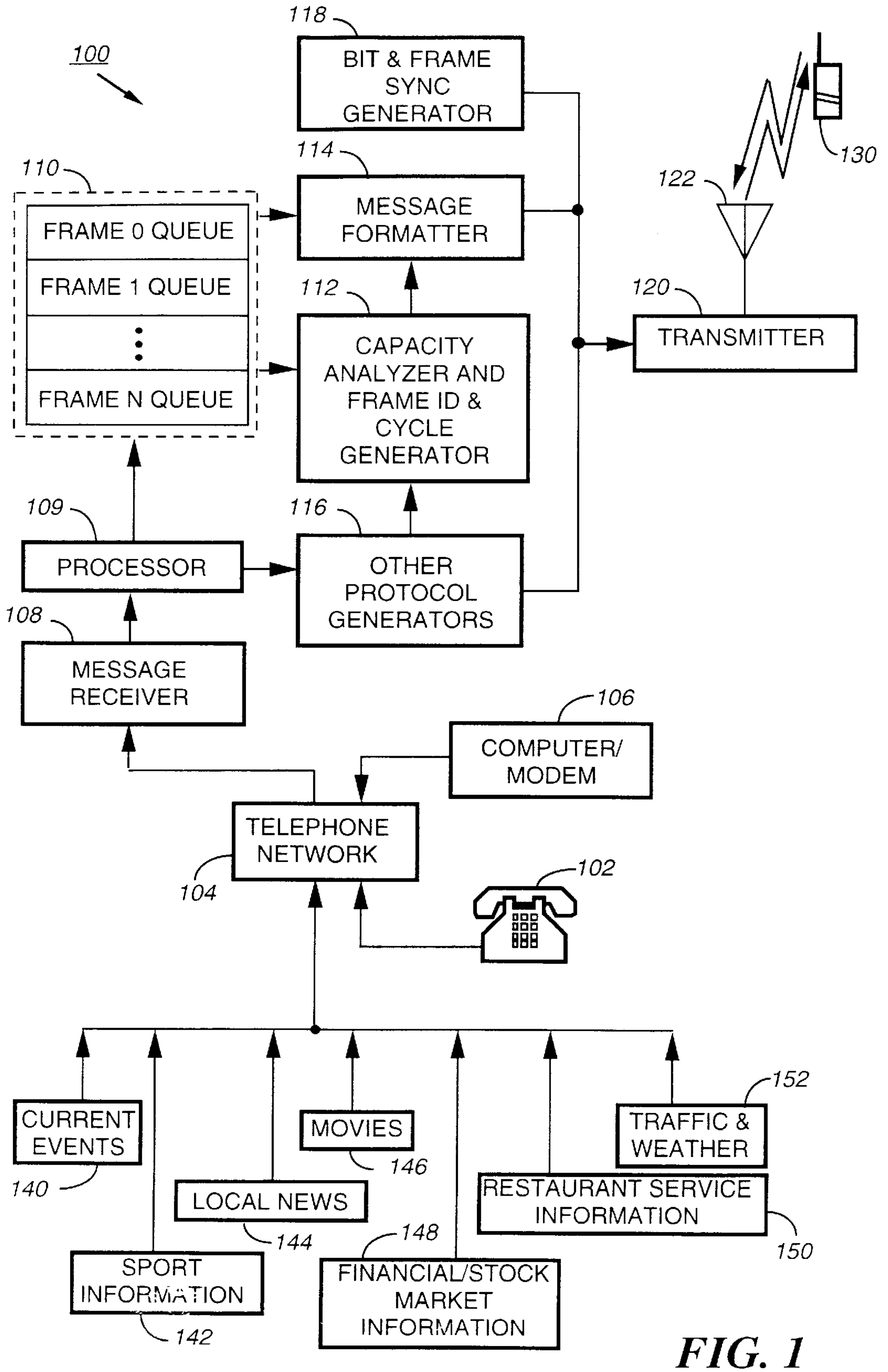
FIG. 1 is an electrical block diagram of a selective call system for providing information services in accordance with a preferred embodiment of the present invention.

FIG. 1 shows an electrical block diagram of a selective call system (or radio frequency communication system) for generating and transmitting (or broadcasting) a selective call signal (or communication signal) including either personal messages or a plurality of information services in accordance with a preferred embodiment of the present invention.

The functions of the selective call system 100 are preferably implemented within software, for example within a MODAX™ 500 Selective Call Terminal which is manufactured by Motorola Inc. Typically, a subscriber can send a message by using a telephone 102 to initiate a transmission of a selective call message. As is well known, the telephone 102 couples to the selective call system 100, in particularly a base station or base site via a telephone network 104, the operation of which is well known to one of ordinary skill in the art. Similarly, a computer/modem 106 is also coupled to the telephone network 104 to enter information, for example alphanumeric or numeric messages. The telephone network 104 couples to a message receiver 108 which receives the messages to be transmitted (broadcast) to at least one of a plurality of selective call devices 130 typically from the public switched telephone network 104.

According to an alternate embodiment, a plurality of information services 140–152 are coupled to the telephone interface network which is coupled to a processor 109 via the message receiver 108. Those skilled in the art will appreciate that the plurality of information service providers 140–152 can be received as radio frequency signal by an antenna.

When the base site processor (encoder) 109 receives information which is periodically transmitted as updates, the information is encoded as a message in the form of a selective call signal (or communication signal). Specifically, the processor 109, coupled to the message receiver 108, determines an appropriate protocol, preferably, the FLEX™ protocol, and address to encode the information service. If the processor 109 determines that the message is to be sent via another signal format, it is passed to one of another protocol generator 116 which can include other protocol generators well known to one of ordinary skill in the art. When the processor has determined that the information services and any messages are to be transmitted on the FLEX™ protocol, the information is encoded and stored in a frame queue buffer 110 which has queues (FRAME O–N QUEUES) for the corresponding frames of the signal, and in this example of the present invention, the corresponding number of frames N is 128. The predetermined frame identification (ID) of the selective call device 130 corresponding to the message is determined and the message is stored in the corresponding frame queue. A capacity analyzer and frame ID/cycle generator 112 determine the sequence of frame IDs to be transmitted and analyze the capacity of each frame to determine the cycle value to be used. The capacity analyzer 112 is also responsive to other protocols being transmitted. For example, if the expected occurrence of a frame is to be replaced by the transmission of one of the other protocols (thereby diminishing the capacity of the frame), the capacity analyzer 112 can account for this with the determined cycle value. A bit and frame sync generator 118 synchronously generates bit and frame synchronization signals. A message formatter 114 determines, in response to the address of selective call devices 130 and the frame queue, the frame which the information is to be included, and a respective message formatting width in display units. The messages are then formatted for transmission. A transmitter 120 accepts signals from blocks 118, 114 and 116 and modulates and transmits radio frequency selective call signals to selective call devices 130 via antenna 122 in a manner well known to those of ordinary skill in the art.

Figure 2:
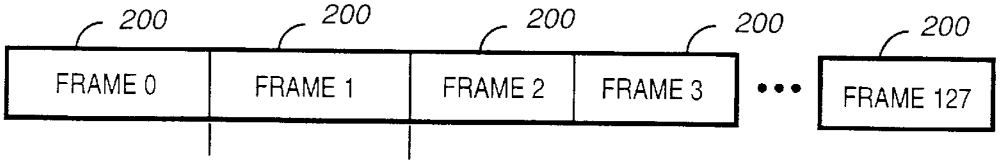
FIGS. 2–4 are timing diagrams illustrating the transmission format of an interleaved information signaling protocol utilized by the selective call system of FIG. 1 in accordance with the preferred embodiment of the present invention.
Figure 3:
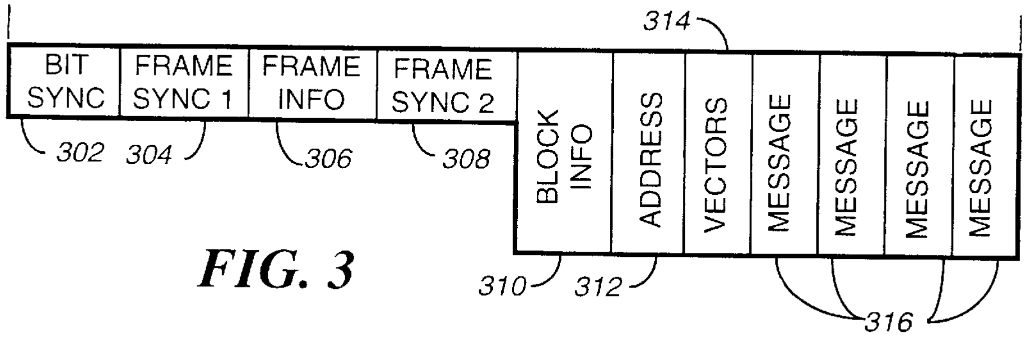
Figure 4:
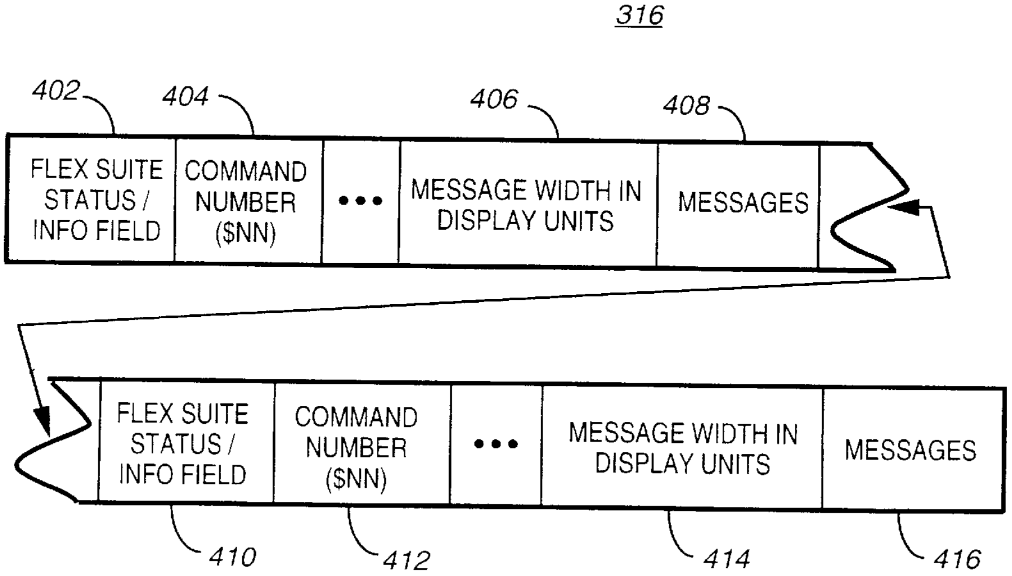

Referring to FIGS. 2–4, timing diagrams of a signaling protocol in accordance with the preferred protocol for selective call messages are shown according to FIG. 1. Referring to FIG. 2, the selective call protocol is encoded, preferably according to the FLEX™ protocol, in a number of, preferably one-hundred-twenty-eight (128), message packets or frames 200. Each frame 200 is preferably 1.875 seconds in duration and has a preferred base data rate of 6400 bits per second. Although, it will be appreciated that other data rates can be used including the ability to use multiple data rates.

Referring to FIG. 3, each frame is comprised of a bit sync signal 302, preferably 32 bits of alternating 1,0 patterns, followed by a FRAME SYNC #1 signal 304 preferably having a predetermined thirty-two bit words and its thirty-two bit inverse, and a FRAME INFO signal 306, preferably one thirty-two bit word having twenty-one variable information bits containing information such as a cycle number and a frame number. The BIT SYNC signal 302 provides bit synchronization to the selective call device(s) 130 while the FRAME SYNC #1 signal 304 provides frame synchronization and includes a signal indicative of the data rate of the message information.

Following the FRAME INFO word 306 is a FRAME SYNC #2 308. Following the FRAME SYNC #2 308 is a block info word signal 310 including information such as the number of priority addresses, end of block information field, and vector start field. The code word of each frames 200 is preferably encoded as 31,21 Bose-Chaudhuri-Hocquenghem (BCH) code words having twenty-one information bits and ten parity bits generated according to the well known BCH algorithm. An additional even parity bit extends the word to a 32,21 code word. The addresses are located in block 312 and the vectors pointing to the messages are located in block 314 and the messages are located in the remaining blocks 316. Generally, all of the address signals within the frame are located in a first portion 312 and the information or message signals are located in a subsequent portion of the block 316. It is well known to those skilled in the art how to locate addresses 312 in a first portion and message information 316 in a second portion of the frame 200. Words 310–316 are shown in a vertical orientation to indicate that these words may be interleaved in order to improve the immunity of the transmission to burst errors. It is understood by one of ordinary skill in the art that interleaving may be modified or eliminated.

Referring to FIG. 4, the message information words 316 are illustrated in more details according to the preferred embodiment of the present invention.

The timing diagram further explodes the block 316 containing the address, command, and information data. This message block contains an information/status field 402, an optional command code 404, a formatting message 406, and a related message 408. The formatting message 406, and related message 408 may be repeated as shown in the secondary information/status field 410, an optional command code 412, a formatting message 414, and a related message 416 to accommodate a number individual selective call messages or related messages corresponding with a specific topic or subtopic address, thus allowing a unique format for each message or information service subscribed. This permits a service provider to pre-format information at a processing location only once, and generate a corresponding formatting message 406, 414 that is sent to selected subscribers. Since the selective call device uses the formatting message(s) 406 to re-format a received message 408 with respect to the display capability of the particular selective call device, all selective call devices can present the related message 408 in a manner that substantially resembles the format intended by the information service provider.

When used in conjunction with information services, the messages are encoded in message information words 316 for transmission to enabled selective call devices 130. In particular, an FLEX™ suite status/information field 402, 410 identifies the type of information, e.g., in this case, an information service, as opposed to individual numeric or alphanumeric selective call messages, is being transmitted. The status/information field 402, 410 can also identify an application other than information services. Alternatively, the absence of the status/information field 402, 410 can indicate that the information or message is a regular selective call message without formatting.

Following the status/information field 402, 410 is a command number 404, 410. The command number 404, 410 identifies (or describes) the function associated with the messages that will follow. In the case of an information service receiver, the command number describes how the topics of the information services are being transmitted. For example, the command number identifies whether the topics of the information services are transmitted according to one of two preferred methods, (1) a range of topics method designated, e.g., by a command number of "000", where the range of the information topics are included, e.g., as the first and last topics (or offset from the first topic to the last topic); or (2) an itemized topic method, designated by e.g., by a command number of "001", where each topic of a particular transmission is included.

Figure 5:
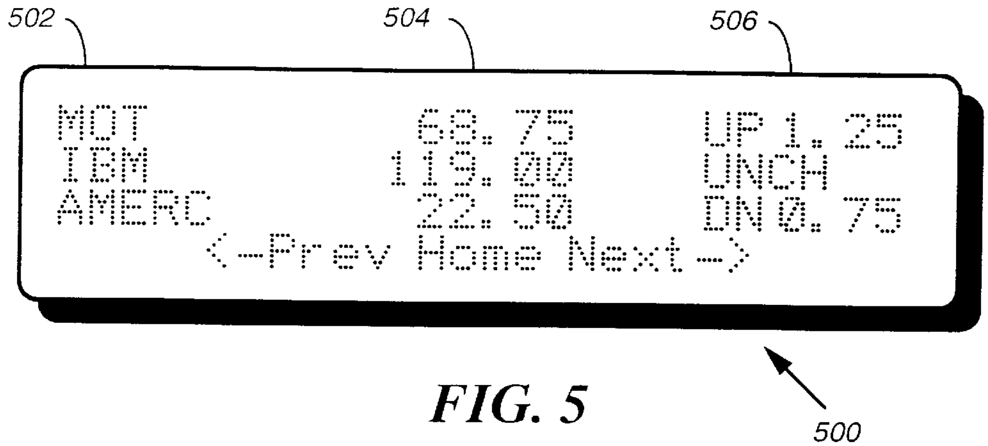
FIG. 5 is a typical four line alphanumeric information display for use with the selective call device in accordance with the present invention.
Figure 6:
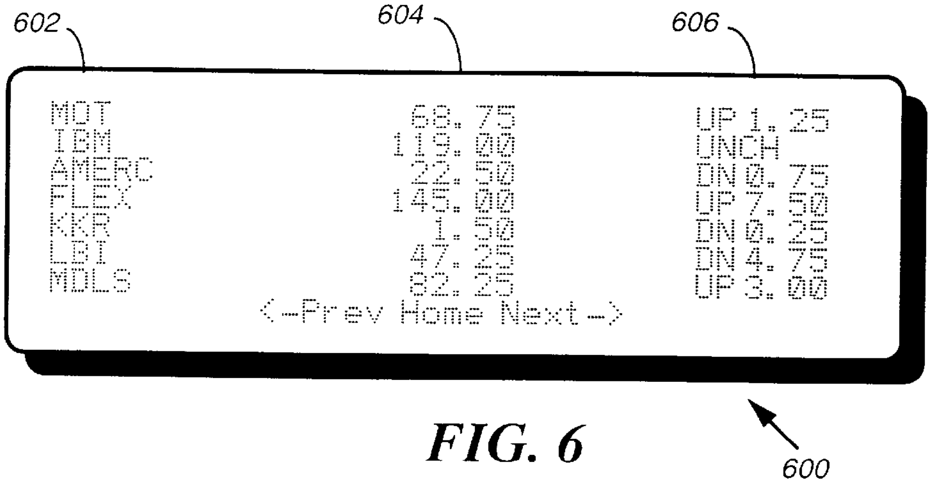
FIG. 6 is a typical eight line alphanumeric information display for use with the selective call device in accordance with the present invention.

Referring to FIG. 5, the display 500 shown is a typical four line alphanumeric information display for use with the selective call device in accordance with the present invention. The display 500 shown is presenting at least a portion (four lines) of a related message 408 including stock market information. The actual message may be any number of lines, some of which are not immediately presented on the display 500, but maintained in the memory 222. Note that the ticker symbols 502, e.g., MOT, IBM, AMERC, are left aligned, while the stock prices 504 are right aligned, and the trend indicators 506 are left aligned. If every display 500 had the same number of horizontal picture elements (pixels), and the characters or symbols were monospaced, then all messages could be presented in the same format on such displays without requiring the formatting message 406. However, as is illustrated in FIG. 6, a display 600 with a higher vertical and horizontal pixel density effectively maintains the relative spacing between the ticker symbols 602, stock prices 604, and the trend indicators 606, to align the fields as shown in FIG. 6.

By example, the display 500 is capable of presenting 26 alphanumeric characters in cells of 6×8 pixels, the character being formed in the inner 5×7 pixels. The density of the display 500 is approximately 20 pixels/cm, or 156 horizontal pixels by 32 vertical pixels. Thus, if a formatting message 406 specifies a screen size of 150 display units (e.g., pixels in this example) for the related message 408, using default values of 6 pixels for alphanumeric characters; 16 pixels for ideographic characters, a character or symbol representing an idea or a thing without expressing the pronunciation of a particular word or words for it, as in a traffic sign, Chinese, or Japanese graphic symbols; and 8 pixels for an ideo-alpha character cell, one can calculate the number of displayable characters per line as follows:

$$DC = \mathrm{INT}(\text{Screen size / default character width}) \quad [1]$$

Using the preceding values, the number of display characters (DC) are 25 alphanumeric characters, 9 ideographic characters, and 18 ideo-alpha characters. Note that equation

[1] never yields a non-integer result, thus only full character cells are presented. If the screen size in display units read from the formatting message 406 exceeds the actual number of horizontal display units or pixels available on the information display, the value DC will default to the screen size.

Referring to FIG. 6, this display 600 is approximately 40% denser than the display shown in FIG. 5. Thus, the related message is "expanded" or scaled to fit in an area approximately the same as that shown in the display 500 shown in FIG. 5. Scaling is performed by the selective messaging device in response to the number of display units recovered from the formatting message 406. Accordingly, the related message 406 is presented in a fashion that display unit for display unit, substantially resembles a mode of presentation intended by the service provider.

The basic intent of the format feature as implemented using the formatting message 408 and the intrinsic capability of the display device in the selective call device comprises maintaining relative vertical alignment between proximate horizontally arranged display rows. The procedure, as discussed by example in the preceding text, operates to project the related message into a virtual display space corresponding with an actual horizontal display unit density of the information display associated with the selective call device. In doing so, the intended vertical alignment between proximate horizontally arranged display rows is preserved. This is evident when comparing the displays shown in FIG. 5, 6, and 7, as the columns are substantially in vertical alignment for different display sizes and horizontal densities. Finally, as described by equation [1], the projection is achieved by dividing a display unit density contained in the formatting message 408 by the actual horizontal display unit density of the information display associated with the selective call device, e.g., the default values of 6 pixels for alphanumeric characters, 16 pixels for ideographic characters, and 8 pixels for the ideo-alpha character cell. In this way, the information is normalized for correct presentation on any display device, and occupies the maximum viewable area, thus fully utilizing the capability of a particular display device.

Figure 7:
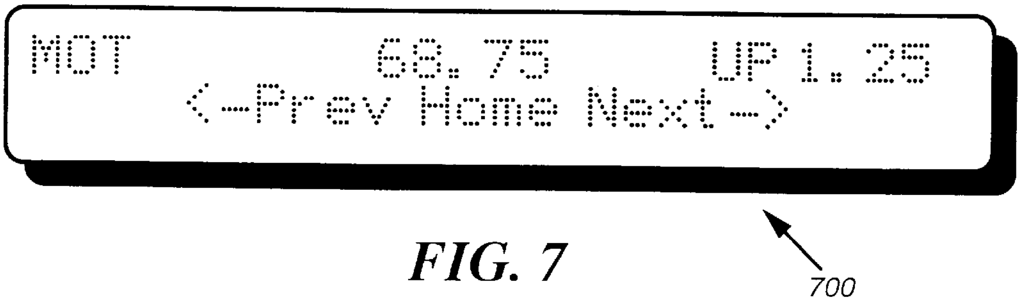
FIG. 7 is a typical two line alphanumeric information display for use with the selective call device in accordance with the present invention.

FIG. 7 is a typical two line alphanumeric information display 700 for use with the selective call device in accordance with the present invention. This figure illustrates the fact that the present invention is backward compatible with conventional information service systems. In FIG. 9, the displayed message has been conventionally formatted for reception by a selective call device enabled with the present invention. The related message 408 was formatted by the service provider at 24 alphanumeric characters in width, and the two line display 700 has a horizontal pixel density of 144 pixels. The selective call system then generates a formatting message 406 which specifies a screen size of 144 pixels, the lowest common horizontal screen size of conventional selective call devices that don't support the present invention. Accordingly, the enabled devices, which displays are shown in FIGS. 5, 6 and 7, will present information in exactly the same format as non-enabled conventional selective call devices. However, when using the instant invention, the enabled devices realize a significant advantage over the conventional devices since the service provider need not reformat messages specially for each selective call device based on the horizontal display capability of the device(s).

Figure 8:
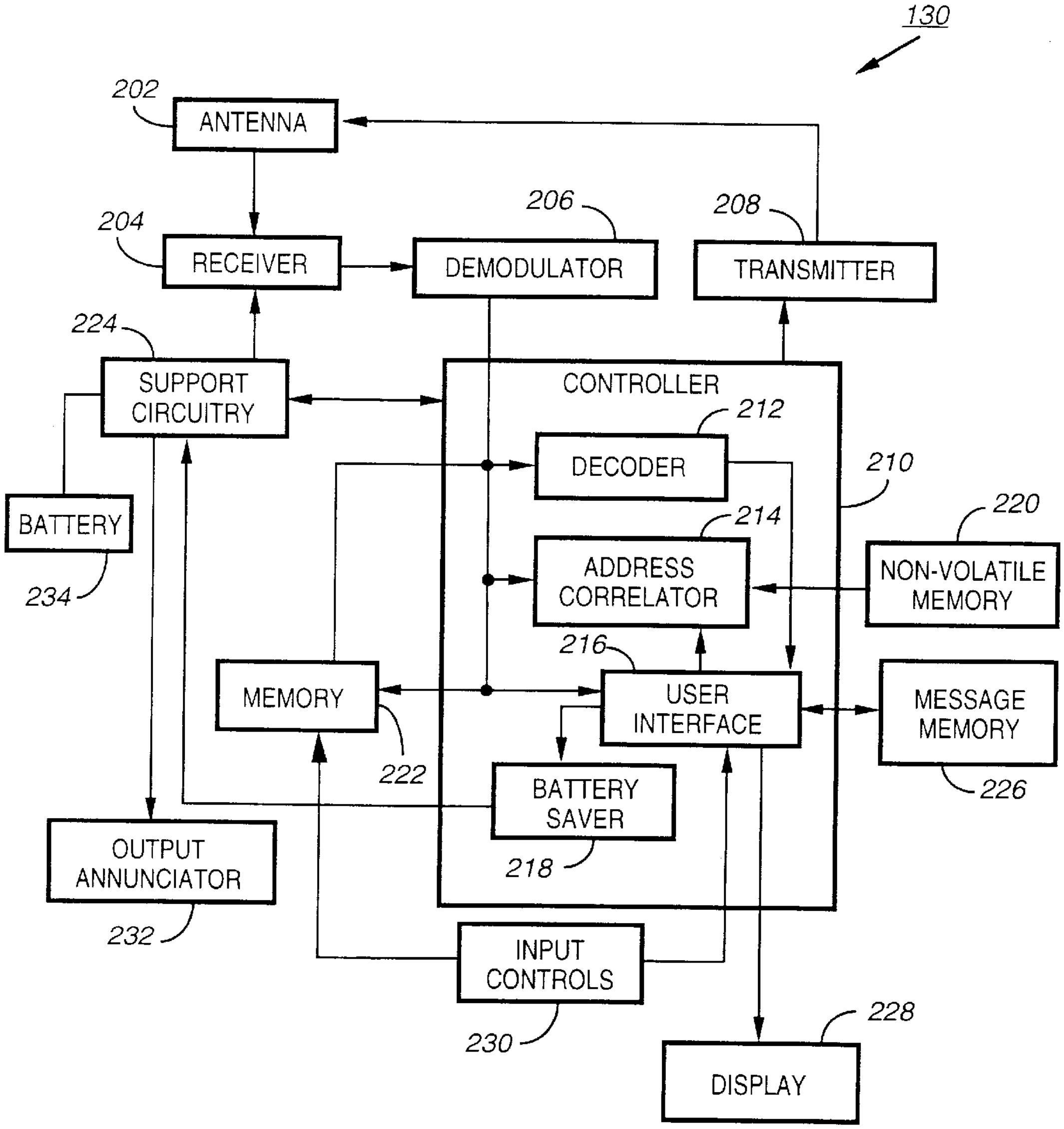
FIG. 8 is an electrical block diagram of a selective call device in accordance with the preferred embodiment of the present invention.

FIG. 8 shows an electrical block diagram of a selective call device according to the preferred embodiment of the present invention. The selective call device (e.g., transceiver or receiver) 130 is powered by a battery 234 and operates to receive and to transmit radio frequency signals via an antenna 202. A receiver 204 is coupled to the antenna 202 to receive the radio frequency signals. A demodulator 206 is coupled to the receiver 204 to recover any information signal present in the radio frequency signals using conventional techniques. The recovered information signal from the demodulator 206 is coupled to a controller 210 that decodes the recovered information in a manner well known to those skilled in the art.

In the preferred embodiment, the controller 210 comprises a microcomputer, such as a Motorola, Inc. manufactured microcomputer, e.g., 68HC11K4 or MC68HC11PH8, and has or comprises a signal processor performing the functions of a decoder which is normally implemented in both hardware and software. The signal processor comprises an address correlator 214 and a decoder 212, using methods and techniques known to those skilled in the art. The address correlator 214 checks the recovered information signal from the output of the demodulator 206 for address information and correlates a recovered address with one of a plurality of predetermined addresses that are stored in the selective call device's non-volatile memory 220. After the address correlator 214 determines that the received signal is directed to the selective call device 130, e.g., by correlating the address in the received signal to one of the predetermined addresses in the memory 220, the decoder 212 decodes the signal for the status/information field 402 to determine if the message contains individual selective call messages or information services data. Absence of the status/information field 402 (FIG. 4) typically indicates that the message being decoded is an individual selective call message. However, in the instant invention, the content of the status/information field 402 may signal a following format message or information that is formatted relative to a previously received and stored format message. The status/information field 402, the command number 404, the format message, related information service topic addresses, and information addresses are preferably stored in the memory 222.

When the user of the selective call device 130 has subscribed to at least one information service, the memory 222 is programmed, e.g., via over-the-air techniques or other appropriate methods of programming, with the information service addresses and associated topic addresses (or sub-addresses) and the associated topic addresses (or topic sub-addresses). The topic sub-addresses are associated with information services. Therefore, each information service has a unique topic address that allows the selective call device 130 to determine when the information service is present within a particular transmission or message. The topic address can be a short form of the information service sub-address or can be unique and different from the information sub-addresses while still being able to identify the presence of the information service within a particular transmission.

Status information are also stored in memory 222, for example, memory 222 is a non-volatile memory or electrically erasable memory indicating the information relating to the information service that the selective call device 130 is programmed to receive. Subsequent to the decoder decoding the presence of the status/information field 402, the decoder decodes the command number 404, and the format message 406 (if indicated), the topic addresses (if indicated) and the information service addresses (if indicated) and the message information in block 408.

After receiving, decoding, and storing an individual selective call message or a selected information service in a memory 226, the selective call device 130 typically presents at least a portion of the stored message to a user, such as by a display 228, e.g., a liquid crystal display. Additionally, along with receiving, decoding, and storing the information, an alert is presented to the user via an output annunciator 232. The alert can include an audible alert, a visual alert, a vibratory or silent alert, or a combination of the aforementioned alerts, using known methods and techniques.

The support circuit 224 preferably comprises a conventional signal multiplexing integrated circuit, a voltage regulator and control mechanism, a current regulator and control mechanism, audio power amplifier circuitry, control interface circuitry, and display illumination circuitry. These elements are arranged to provide support for the functions of the selective call device 130 as requested by a user.

Additionally, the controller 210 determines from the enabled or disabled status information in the memory 222 whether to conserve power upon detection of an address information. That is, when a received and recovered address information correlates with a predetermined address in the non-volatile memory 220, the controller 210 checks the status information corresponding to the correlated predetermined address information to determine whether that address is enabled. If the controller 210 determines that the correlated predetermined address is not enabled then the decoder 212 is not invoked. Further, the controller 210 instructs the battery saver 218 to begin conserving the power of the selective call device 130. The battery saver 218 signals the support circuit 224 to enter a low power mode (battery save mode). A number of power consuming circuits may be directed to a low power or standby mode of operation. Additionally, the signal from the battery saver 218 signals, or strobes, the receiver circuitry 204 to a low power mode to conserve power.

In this way, when a correlated address is not enabled, as indicated by the associated status information, the selective call device 130 conserves power immediately, while not decoding an associated message and also not storing the message in message memory 226. Of course, the battery saver 218 will re-enable the receiver and other circuits at some later time. Methods of power conservation strobing in selective call devices are known to those skilled in the art. Further, the controller 210 inhibits any alerts to the user via the output annunciator 232. By not alerting again, power conservation is maximized. The status information, corresponding to each predetermined address information stored in the memory 222, allow the controller 210 to disable functions in the selective call device 130, and to conserve power when a correlated address is disabled, e.g., when no information service is selected for the address port. Input controls 230 are coupled to the memory 222 and the user interface 216 for receiving user inputs, including but not limited to programming, manipulating data and sending commands to the selective call device 130.

In summary, the encoder generates the selective call signal comprising the address corresponding with the selective call device, the formatting message, and the related message. A transmitter then broadcasts the selective call signal to at least one of a plurality of selective call devices subscribing to an information service provider.

The selective call device uses a receiver to receive the selective call signal. The processor correlates the recovered address with the predetermined address stored in the selective call device, and determines selection of the device. The decoder operates to decode the formatting message and the related message contained in the selective call signal in response to the processor determining selection of the selective call device. Finally, the information display presents at least a portion of the related message in accordance with a format determined at least in part by the formatting message.

What is claimed is:

1. A selective call device, comprising:

a receiver for receiving a selective call signal comprising an address, a formatting message, and a related message;

a processor for correlating a recovered with a predetermined address in the selective call device to determine selection of the selective call device;

a decoder that decodes the formatting message and the related message contained in the selective call signal in response to the processor determining selection of the selective call device; and an information display that presents at least a portion of the related message in accordance with a format determined at least in part by the formatting message, wherein the formatting message comprises a horizontal screen size in display units and wherein the format further comprises projecting related message into a virtual display space corresponding with an actual horizontal display unit density of the information display associated with the selective call device by dividing a display density contained in the formatting message by the actual horizontal display unit density of the information display accociated with the selective call device, thus preserving an intended vertical alignment between proximate horizontally arranged display rows.

2. The selective call device according to claim 1 wherein the formatting message is retained in a memory, and subsequent received related messages are presented in accordance with the format determined at least in part by the formatting message.

3. The selective call device according to claim 1 wherein the related message contained in the selective call signal comprises information that represents textual information.

4. The selective call device according to claim 1 wherein the related message contained in the selective call signal comprises information that represents alphanumeric information.

5. The selective call device according to claim 1 wherein the related message contained in the selective call signal comprises information that represents numeric information.

6. The selective call device according to claim 1 wherein the related message contained in the selective call signal comprises information that represents ideographic information.

7. The selective call device according to claim 1 wherein the format comprises maintaining relative vertical alignment between proximate horizontally arranged display rows.

8. A selective call system comprising:

a base site processor comprising:

an encoder that generates a selective call signal comprising an address corresponding with a selective call device, a formatting message, and a related message;

a transmitter that broadcasts the selective call signal to a plurality of selective call devices subscribing to an information service provider; and a selective call device comprising:

a receiver for receiving the selective call signal;

a processor for correlating a recovered address with a predetermined address in the selective call device to determine selection of the selective call device;

a decoder that decodes the formatting message and the related message contained in the selective call signal in response to the processor determining selection of the selective call device; and an information display that presents at least a portion of the related message in accordance with a format determined at least in part by the formatting message, wherein the formatting message comprises a horizontal screen size in display units and wherein the format further comprises projecting related message into a virtual display space corresponding with an actual horizontal display unit density of the information display associated with the selective call device by dividing a display density contained in the formatting message by the actual horizontal display unit density of the information display associated with the selective call device, thus preserving an intended vertical alignment between proximate horizontally arranged display rows.

9. The selective call system according to claim 8 wherein the formatting message is retained in a memory in the selective call device, and subsequent received related messages are presented in accordance with the format determined at least in part by the formatting message.

10. The selective call system according to claim 8 wherein the related message contained in the selective call signal comprises information that represents textual information.

11. The selective call system according to claim 8 wherein the related message contained in the selective call signal comprises information that represents alphanumeric information.

12. The selective call system according to claim 8 wherein the related message contained in the selective call signal comprises information that represents numeric information.

13. The selective call system according to claim 8 wherein the related message contained in the selective call signal comprises information that represents ideographic information.

14. The selective call system according to claim 8 wherein the format comprises maintaining relative vertical alignment between proximate horizontally arranged display rows.

* * * * *